(12) United States Patent
Ou

(10) Patent No.: US 9,721,015 B2
(45) Date of Patent: Aug. 1, 2017

(54) PROVIDING A QUERY RESULTS PAGE

(71) Applicant: Alibaba Group Holding Limited, George Town, KY (US)

(72) Inventor: Zhou Ou, Hangzhou (CN)

(73) Assignee: Alibaba Group Holding Limited (KY)

( * ) Notice: Subject to any disclaimer, the term of this patent is extended or adjusted under 35 U.S.C. 154(b) by 543 days.

(21) Appl. No.: 14/307,161

(22) Filed: Jun. 17, 2014

(65) Prior Publication Data

US 2015/0012513 A1    Jan. 8, 2015

(30) Foreign Application Priority Data

Jul. 2, 2013    (CN) .......................... 2013 1 0274621

(51) Int. Cl.
    *G06F 17/30*    (2006.01)
(52) U.S. Cl.
    CPC .. *G06F 17/30864* (2013.01); *G06F 17/30867* (2013.01); *G06F 17/30905* (2013.01)
(58) Field of Classification Search
    None
    See application file for complete search history.

(56) References Cited

U.S. PATENT DOCUMENTS

| 8,346,815 | B2 | 1/2013 | Dasher et al. |
| 8,370,334 | B2 | 2/2013 | Ferrenq et al. |
| 8,463,770 | B1 | 6/2013 | Thirumalai et al. |
| 8,849,845 | B2 | 9/2014 | Pasquero et al. |
| 2008/0172377 | A1 * | 7/2008 | Kapadia ............ G06F 17/30867 |
| 2011/0093478 | A1 | 4/2011 | Starks et al. |

OTHER PUBLICATIONS

Anonymous. "FAQ (Frequently Asked Questions) | Sphinx". Nov. 3, 2010, pp. 1-2. Retrieved Sep. 3, 2014 http://web.archive.com/web/20101103114224/http://www.sphinxsearch.com/info/faq.

* cited by examiner

*Primary Examiner* — Anh Tai Tran
(74) *Attorney, Agent, or Firm* — Van Pelt, Yi & James LLP

(57) ABSTRACT

Providing a query results page is disclosed, including by: receiving a current query; determining a correction factor corresponding to the current query; determining a corrected query results request quantity based at least in part on the correction factor; performing an initial search for a plurality of query results responsive to the current query, wherein a quantity of query results included in the plurality of query results corresponds to the corrected query results request quantity; determining a quantity of compliant query results of the plurality of query results by comparing at least some of the plurality of query results to one or more display conditions and identifying compliant query results that meet the one or more display conditions; and causing a page of query results to be presented based at least in part on the quantity of compliant query results.

20 Claims, 6 Drawing Sheets

PROVIDING A QUERY RESULTS PAGE

CROSS REFERENCE TO OTHER APPLICATIONS

This application claims priority to People's Republic of China Patent Application No. 201310274621.4 entitled PAGINATION DISPLAY CONTROL METHOD AND DEVICE, filed Jul. 2, 2013 which is incorporated herein by reference for all purposes.

FIELD OF THE INVENTION

The present application relates to the field of data processing. Specifically, the present application relates to determining query results to display at a page.

BACKGROUND OF THE INVENTION

Conventionally, in response to a submitted user query, a server may acquire a set of query results from a service search engine or a database according to a combination of service conditions and then display the acquired query results to the user. The most common method of display is to paginate the query results and send the query results to the user's browser. Displaying query results across one or more pages is not only user friendly, but can also increase speed of returning query results. In addition, paginating query results can also lead to increased page browsing and advertisement exposure for the same quantity of information. In displaying query results in paginated form, a desired quantity of query results to display is predetermined for each page of query results.

At some websites, a query result is to meet one or more display conditions before it can be displayed at a query results page. Put another way, a query result that does not meet the one or more display conditions is not displayed at a query results page. Conventionally, a query result that is determined to be relevant to a search query is retrieved and then evaluated for whether it meets the one or more display conditions. For example, a query result comprises a set of product information. To generate query results for a page, a quantity of sets of product information that match a search query equal to the desired quantity of query results to display per page is retrieved. In this example, a display condition is that a set of product information must include at least three images of the corresponding product. In some instances, not all the attributes of a set of product information are indexed and as such, the set of query results was not filtered for only the query results that match the display conditions at the time that they were searched. Therefore, the retrieved sets of product information for the search query may include at least some sets of product information that do not meet the display condition of having at least three images of the product. However, the sets of product information that do not meet the display condition cannot be presented at a page of query results and are therefore eliminated as query results. Another display condition is that a set of product information must pass a security authentication and those sets of product information that do not pass the security authentication cannot be presented at a page of query results and are therefore discarded as query results. If at least some of the retrieved sets of product information do not match a display condition and therefore cannot be displayed at the query results page, then fewer than the desired quantity of query results can be displayed at the query results page.

For example, a desired quantity of query results to display per page is set to 50 query results. If among the 50 query results that are found to be displayed at a search results page, it is determined that five of such query results do not meet display conditions, then only 45 query results can be displayed at the search results page. However, 45 query results are fewer than the desired quantity of 50 query results to display per page. One conventional approach to solve this problem is to replace the eliminated query results with blank space. While this approach is relatively simple, presenting blank spaces at a query results page may provide a poor user experience, waste display resources, and lower system efficiency.

Another conventional approach to solve this problem is to perform a supplemental search and thus sequentially locate a quantity of new query results equal to the quantity that was eliminated for not meeting the display condition(s) and then merge the new query results with the previously found query results that met the display condition(s), thus bringing the total quantity of request results up to the desired quantity. However, in this approach, some of the new query results retrieved using the supplemental query can fail to meet the display condition(s). It would then be necessary to perform another one or more supplemental searches until the number of retrieved query results that meet display requirements reaches exactly the desired quantity. It is often necessary with such an approach to conduct multiple supplemental searches before being able to obtain the desired quantity of query results to display that meet the display condition(s). As such, this second approach is inefficient and slow.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of providing a query results page are described herein. A current query is received. For example, the current query comprises one or more user input keywords. A correction factor configured to adjust a page query results quantity is determined. A corrected query results request quantity is determined based at least in part on the correction factor. An initial search for a plurality of query results corresponding to the corrected query results request quantity is performed. A quantity of compliant query results from the plurality of query results is determined by comparing the plurality of query results to one or more display conditions. A page of query results is provided based at least in part on the quantity of compliant query results. In the event that the quantity of compliant query results is less than a desired quantity of query results to display per page, one or more supplemental searches for additional query results responsive to the current query are performed.

Figure 1:
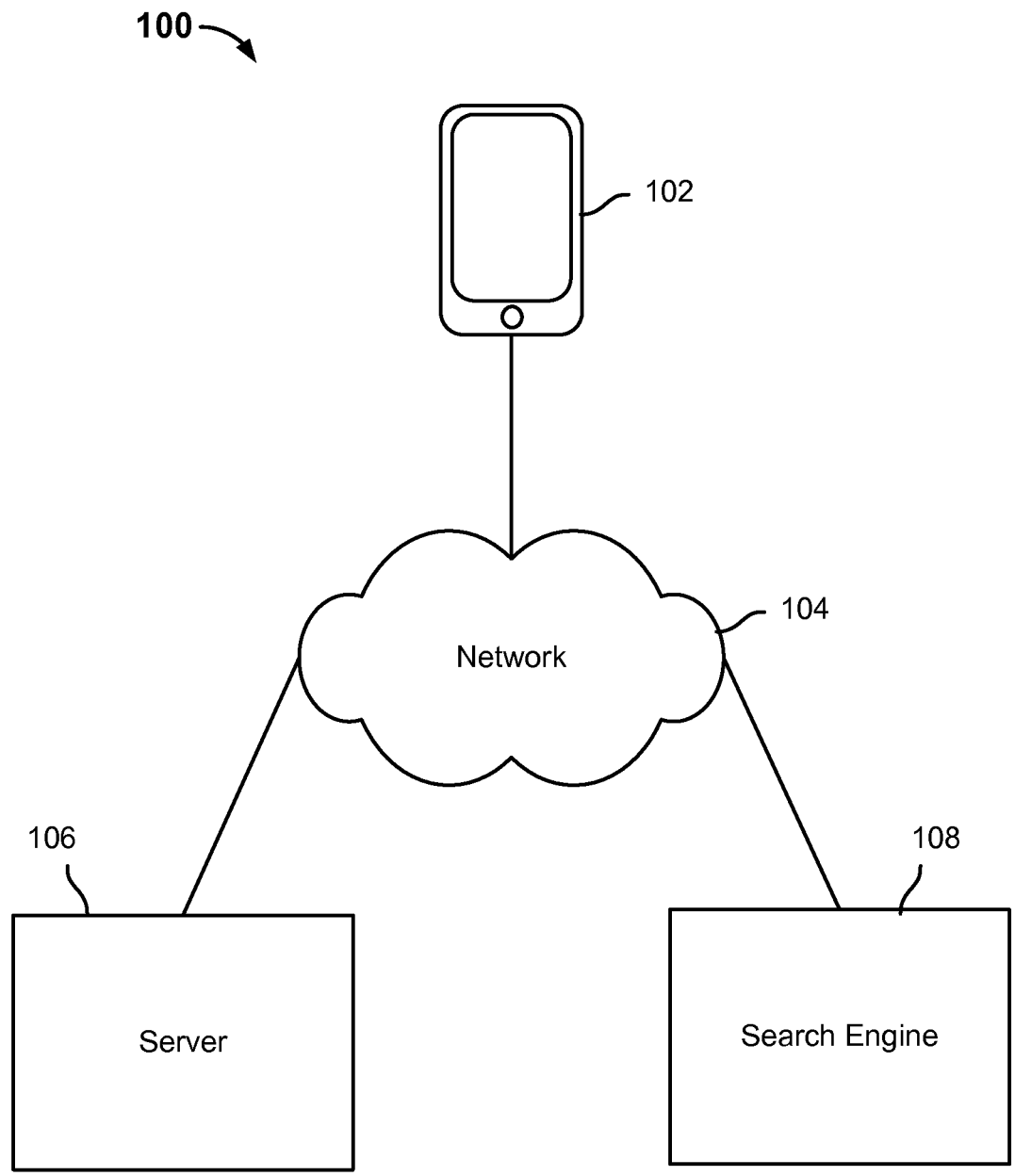
FIG. 1 is a diagram showing an embodiment of a system for providing a page of query results.

FIG. 1 is a diagram showing an embodiment of a system for providing a page of query results. In the example, system 100 includes client device 102, network 104, server 106, and search engine 108. Network 104 includes high-speed data networks and/or telecommunications networks.

While client device 102 is shown to be a smart phone, other examples of client device 102 include a desktop computer, a laptop computer, a tablet device, a mobile device, or any other computing device. A user may use client device 102 to access a website operated by server 106. For example, the website comprises an e-commerce website at which various products and/or services are sold. A user may submit a current query via client device 102 to server 106. For example, the current query may include user input keywords describing a product that the user would like to purchase.

In response to receiving the current query, server 106 is configured to initiate an initial search for query results responsive to the current query. In various embodiments, a desired quantity of query results to display per page of query results and one or more display conditions are stored at server 106. In various embodiments, a "desired quantity of query results to display per page" represents a number of compliant query results that is required to be presented at each query results page. In various embodiments, a "display condition" is a condition that a query result must meet or be compliant with in order to be presented at a query results page. In various embodiments, a "compliant query result" is a query result that meets or satisfies the one or more display conditions. The display conditions may be configured by a system administrator or a computer program. For example, a display condition may include a requirement for displayable content of a query result. For example, when sets of product information are the query results that are being searched for in response to a current query at an e-commerce website, a display condition can be that a set of product information includes at least three images of a product. If a set of product information has fewer than three images, then that set of product information does not meet the display condition and therefore cannot be displayed at a query results page. In another example, in order to ensure network security, another display condition may also include a requirement for security authentication. That is, a query result must satisfy a third party security authentication if it is to be displayed at a query results page. If a query result fails the security authentication, then that query result does not meet the display condition and therefore cannot be displayed at a query results page. The display conditions described above are merely examples and more, less, or different display conditions may be implemented in actual practice.

Because it is assumed that at least some query results retrieved for a query may not meet all the display conditions stored at server 106, server 106 is configured to determine a quantity of query results responsive to the current query greater than the desired quantity of query results to display per page to request from search engine 108. As will be described below, server 106 is configured to use a correction factor corresponding to the current query to determine the corrected query results request quantity, which is a quantity of query results greater than the desired quantity of query results to display per page. Server 106 is configured to request search engine 108 to perform an initial search for a number of query results responsive to the current query equal to the corrected query results request quantity. Search engine 108 is configured to search for query results stored at a database (not shown) storing sets of product information, for example. Search engine 108 is configured to return the number of query results responsive to the current query equal to the corrected query results request quantity back to server 106. Server 106 is configured to determine how many of the retrieved query results meet/comply with the one or more display conditions. If server 106 determines that there is at least a number of query results compliant with the display conditions equal to the desired quantity of query results to display per page, then server 106 is configured to send the compliant query results in one query results page to be displayed at client device 102. Otherwise, if server 106 determines that there is a number of query results compliant with the display conditions less than the desired quantity of query results to display per page, then server 106 is configured to initiate one or more supplemental searches for query results responsive to the current query, as will be described in further detail below.

Figure 2:
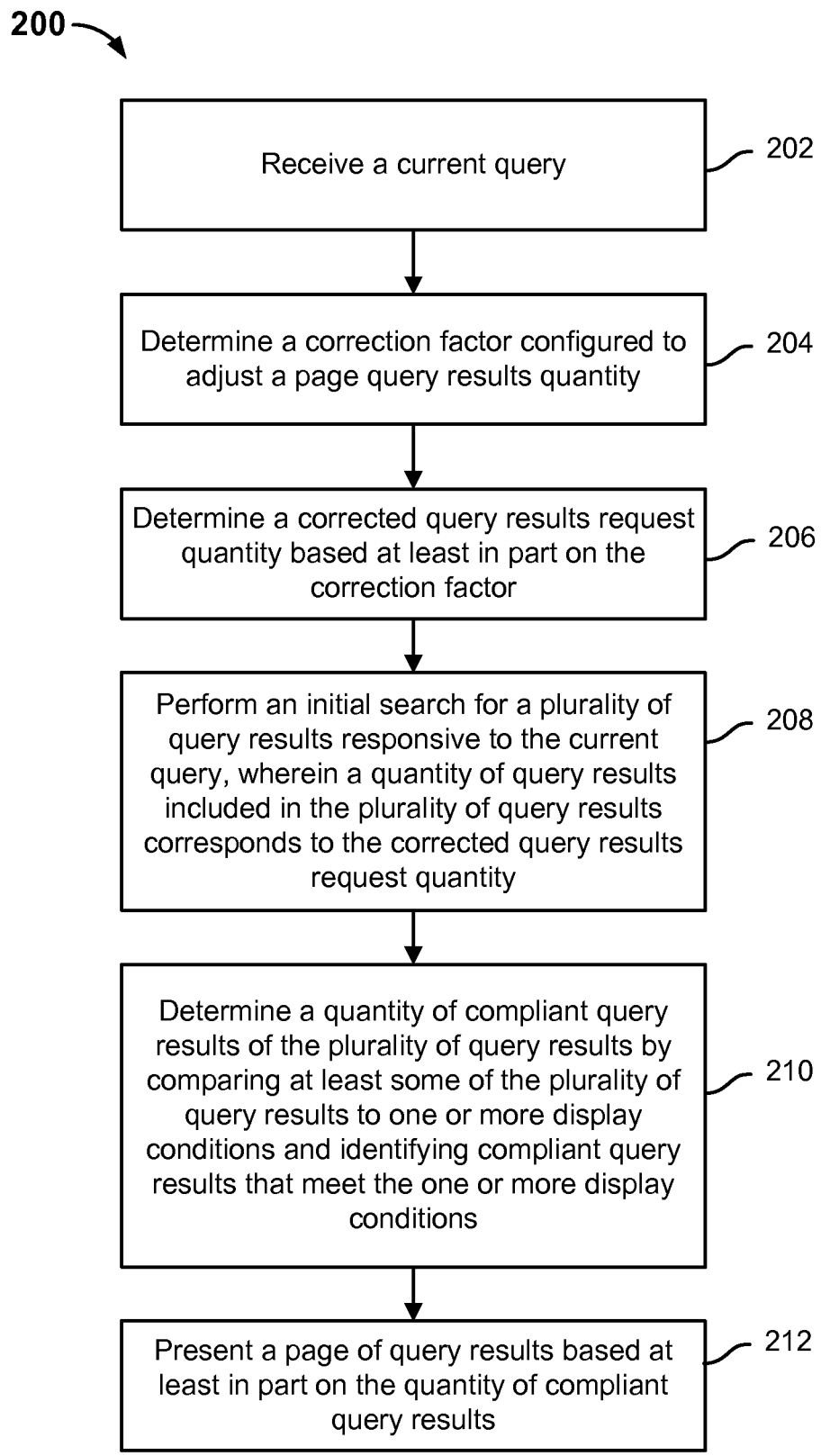
FIG. 2 is a flow diagram showing an embodiment of a process for providing a page of query results.

FIG. 2 is a flow diagram showing an embodiment of a process for providing a page of query results. In some embodiments, process 200 is implemented at system 100 of FIG. 1.

At 202, a current query is received.

A current query for which query results are to be found, is received at a server. For example, when a specific service is accessed in response to a user selection of a link (e.g., a link for online shopping for popular deals at an e-commerce website), the server may request query results from a search engine or a database that match the selected link. In another example, in response to a user input of search keywords into an input box, the server may request query results from a search engine that match the search keywords. However, not all retrieved query results necessarily meet one or more display conditions. Therefore, each of the retrieved query results needs to be analyzed to determine whether it meets the one or more display conditions. Then, only the portion of the retrieved query results that comply with the one or more preset display conditions are eventually displayed at a query results page for the user.

The retrieved query results are to be displayed at one or more query results pages and each page is associated with a desired quantity of query results to display. For example, the desired quantity of query results to display for each page is 50 query results. In various embodiments, the desired quantity of query results to display per page is configured by a system administrator. In some embodiments, the query results to display at a single page are determined at a time. In some embodiments, the server searches for query results by querying a search engine or a database. The server then analyzes the retrieved query results to determine which query results meet with one or more display conditions to determine which query results can be displayed in a query results page.

At 204, a correction factor configured to adjust a page query results quantity is determined.

In various embodiments, a correction factor, r, comprises an estimated proportion of query results from one or more retrieved sets of query results that will not meet one or more display conditions.

A correction factor r can be determined by various techniques. In a first embodiment, a correction factor r is predetermined using recorded historical data regarding the proportion of query results within one or more retrieved sets of query results that do not meet one or more display conditions. In this embodiment, for every preset interval of time, the number of query results among all query results retrieved over that interval of time that do not meet the display conditions is counted and the ratio of the number of query results that do not meet the display conditions to the total number of query results retrieved over that interval of time is determined. This ratio is used as the correction factor r. For example, the counting of number of query results that do not meet the display conditions is conducted once daily. Assuming that the total number of query results retrieved over a day is 1,000 and that 50 of them do not meet the display conditions, then the ratio of the number of query results that do not meet the display conditions to the total number of query results retrieved is 50/1,000=0.05. Thus, the correction factor is r=0.05.

Figure 3:
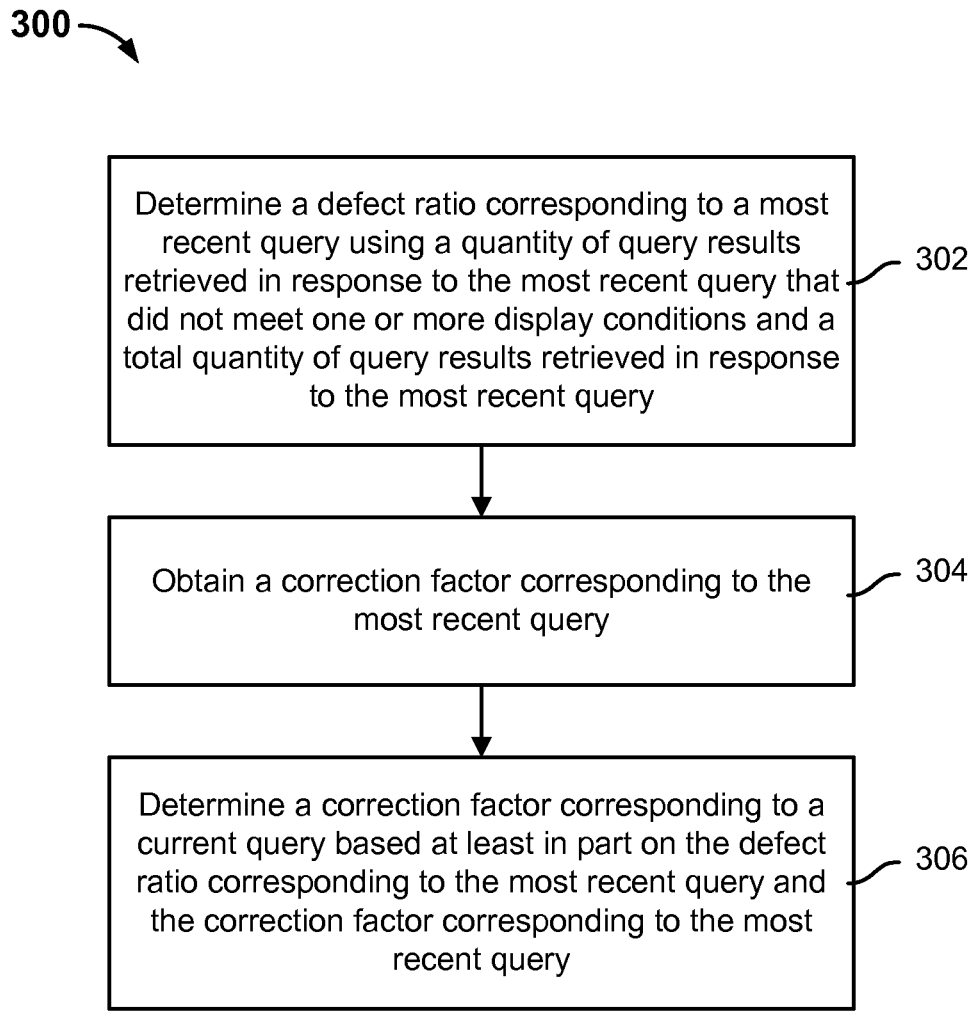
FIG. 3 is a flow diagram showing an embodiment of a process of determining a correction factor corresponding to a current query.

In a second embodiment, a correction factor is dynamically determined for obtaining query results for a current query using the query results retrieved for one or more previous queries. For example, in some cases, it might not be possible to acquire historical data regarding the proportion of query results within one or more retrieved sets of query results that do not meet one or more display conditions and/or predetermine the correction factor r using such data. For example, the correction factor r to use to determine a quantity of query results to request from a server and to display at a single page in response to a current query can be determined based at least in part on the proportion of query results retrieved for the most recent (e.g., immediately previous) query that did not meet the display conditions, and at least in part on the correction factor used to obtain query results for that most recent query. For example, the correction factor r to use to determine a quantity of query results to request from a server and to display at a single page in response to the most recent query can be determined based on the proportion of query results retrieved for the second to the most recent query that did not meet the display conditions and the correction factor used to obtain query results for the second to the most recent query. Therefore, this second embodiment of determining the correction factor is an iterative process. FIG. 3 below describes an example of determining the correction factor for a current query using this second embodiment.

Returning to FIG. 2, the correction factor r determined for the current query is stored (e.g., and may be retrieved to determine the correction factor corresponding to a subsequent query).

At 206, a corrected query results request quantity is determined based at least in part on the correction factor.

For example, the desired quantity of query results to display per page is represented by N. Because it is assumed that at least some of the query results retrieved in response to the current query will not meet the display conditions, a quantity of query results greater than the desired quantity of query results to display per page is to be requested from the data source in an initial search. In various embodiments, the corrected query results request quantity represents the desired quantity of query results to display per page adjusted by the correction factor. For example, the corrected query results quantity is represented by $N_1$. In some embodiments, the corrected query results quantity is determined using the following formula:

$$N_1 = N*(1+r) \qquad (1)$$

At 208, an initial search for a plurality of query results responsive to the current query is performed, wherein a quantity of query results included in the plurality of query results corresponds to the corrected query results request quantity. An initial search for a number of query results responsive to the current query that is equal to the corrected query results quantity of query results is performed. For example, the server can acquire $N_1$ query results through a page query request including by submitting the search query to a search engine to acquire at least $N_1$ query results. Then, the $N_1$ query results of the found set in the initial search are selected based on any appropriate technique. For example, the search engine may first rank the found query results based on a set of criteria and then the first $N_1$ query results can be acquired for the initial search. In some embodiments, if fewer than the $N_1$ number of query results to display per page can be found from the data source, then the initial search is configured to be performed at a second data source, different from the first data source. The difference in the number of query results found at the first data source and the $N_1$ number of query results to display per page can be found at the second data source.

Retrieving query results from a search engine or a database are examples of performing the initial search. In actual implementation, any other appropriate technique of obtaining query results and/or types of data sources can be used in performing the initial search.

At 210, a quantity of compliant query results of the plurality of query results is determined by comparing at least some of the plurality of query results to one or more display conditions and identifying compliant query results that meet the one or more display conditions.

Each query result of the $N_1$ query results that were retrieved by the initial search is tested against (e.g., compared to) the display conditions to determine whether it meets the display conditions. In various embodiments, a retrieved query result that matches the one or more display conditions is referred to as a "compliant" query result. Those query results of the $N_1$ query results retrieved by the initial search that meet the display conditions are determined. For example, the number of query results of the $N_1$ query results that were retrieved that meet the display conditions is represented as $N_{1correct}$.

In some embodiments, in the process of comparing each query result of the $N_1$ query results that were retrieved, the query results that did meet the display conditions are retained and are to be displayed at the query results page and the query results that did not meet the display conditions are eliminated from being displayed. Each of the query results that did meet the display conditions is included in the count of compliant query results, $N_{1correct}$.

At 212, a page of query results is caused to be presented based at least in part on the quantity of compliant query results. The number of compliant query results, $N_{1correct}$, is compared to the number of the desired quantity of query results to display per page, N, to determine how the page of query results is to be presented. The compliant query results to display at a page of query results are sent to a client device and are displayed at a web browser executing at the client device.

In the event that the number of compliant query results, $N_{1correct}$, is equal to the desired quantity of query results to display per page, N ($N_{1correct}=N$), then the $N_{1correct}$ query results are displayed at the query results page. For example, the page of query results including the $N_{1correct}$ query results is sent to a client device where the page is to be presented.

In some embodiments, in the event that there still are retrieved query results remaining after $N_{1correct}=N$ compliant query results are found, then the remaining query results of the retrieved set that have yet to be compared to the display conditions are discarded (e.g., not considered for being displayed at the current query results page). Put another way, after $N_{1correct}=N$ compliant query results are found, any remaining query results retrieved by the initial search that have yet to be tested against the display conditions are discarded. For example, discarded query results may be considered to be displayed at a subsequent query results page. For example, if the nth (e.g., ranked) query result ($n<N_1$) of the retrieved $N_1$ query results is determined to comply with the display conditions and then $N_{1correct}=N$ is satisfied, then the page query for the next search (e.g., a supplemental search) of query results begins extracting from the n+1th query result from the data source.

Figure 4:
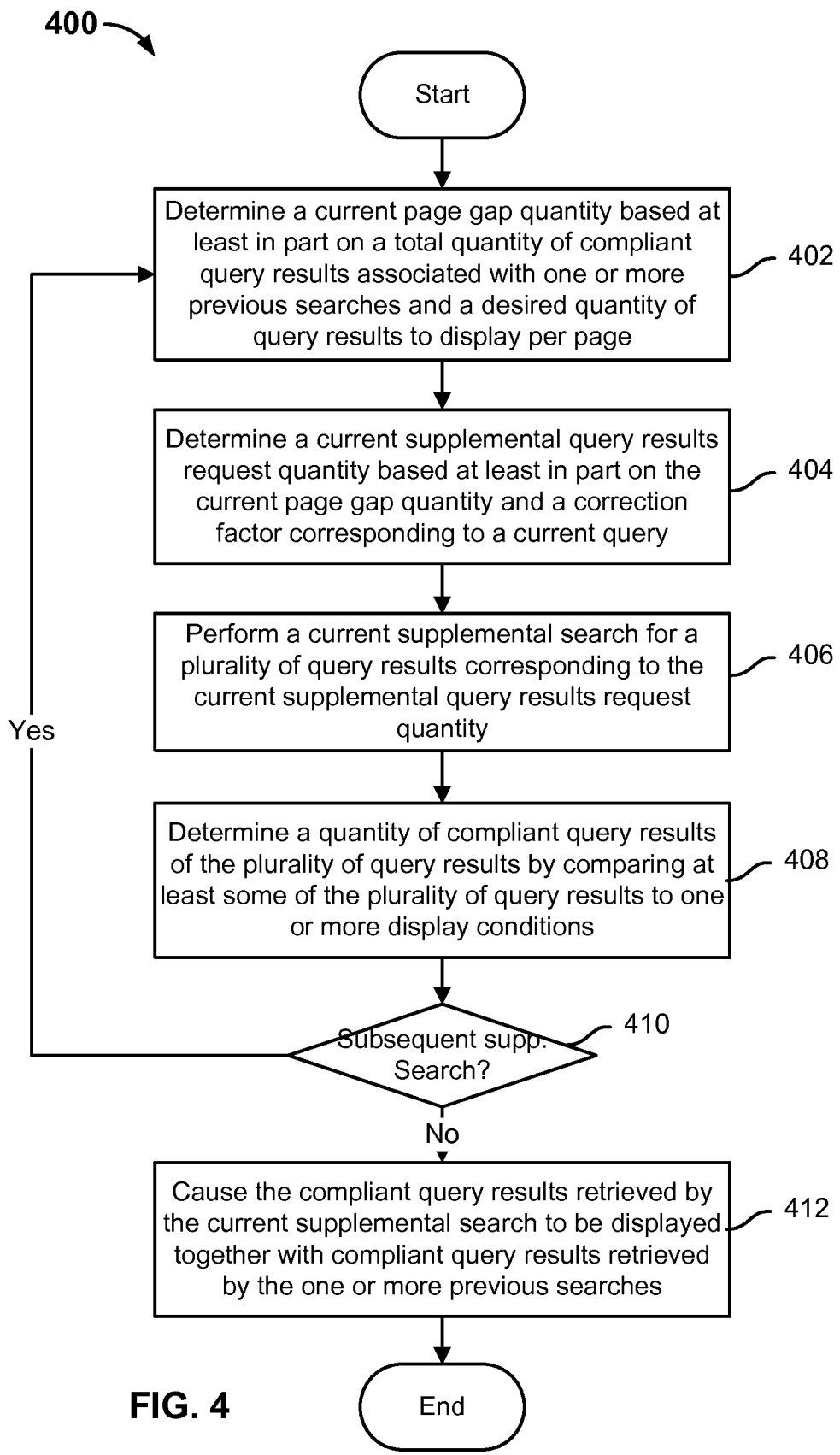
FIG. 4 is a flow diagram showing an embodiment of a process of performing a supplemental search for a current query.

However, in the event that after all of the $N_1$ retrieved query results retrieved by the initial search have been compared with the display conditions and the number of compliant query results, $N_{1correct}$, is less than the desired quantity of query results to display per page, N ($N_{1correct}<N$), then there are fewer than the desired quantity of query results to display per page, which means that additional query results need to be obtained to be added to the query results page. In the event that $N_{1correct}<N$, a supplemental search for query results responsive to the current query is to be performed. A supplemental search for query results is configured to obtain at least the difference in the number of query results between the $N_{1correct}$ number of compliant query results and the N desired quantity of query results to display per page, ($N-N_{1correct}$). FIG. 4, below, shows an example of performing a supplemental search for query results.

FIG. 3 is a flow diagram showing an embodiment of a process of determining a correction factor corresponding to a current query. In some embodiments, process 300 is implemented at system 100 of FIG. 1. In some embodiments, step 204 of process 200 of FIG. 2 is implemented using the process of FIG. 3.

Process 300 can be used in some embodiments to determine the correction factor r to use to determine a quantity of query results to request from a server and to display at a single query results page in response to a current query.

At 302, a defect ratio corresponding to a most recent query is determined using a quantity of query results retrieved in response to the most recent query that did not meet one or more display conditions and a total quantity of query results retrieved in response to the most recent query. For example, the defect ratio $R_w$ corresponding to the most recent query is equal to $N_{wrong}$, which is the number of query results retrieved in response to the most recent query that did not comply with one or more display conditions, divided by $N_{total}$, which is the total number of query results retrieved in response to the most recent query. Put in other words, the defect ratio $R_w$ can be expressed as the following formula:

$$R_w = N_{wrong}/N_{total} \quad (2)$$

The most recent query is the query that was submitted to the query (e.g., by the same or a different user) relative to the current query.

At 304, a correction factor corresponding to the most recent query is obtained. Because the correction factor is determined for each query, the correction factor corresponding to the most recent query can be obtained from storage. For example, the correction factor corresponding to the most recent query can be represented by r'.

At 306, a correction factor corresponding to the current query is determined based at least in part on the defect ratio corresponding to the most recent query and the correction factor corresponding to the most recent query. In some embodiments, the correction factor r corresponding to the current query is determined as $r=R_w*a+r'*(1-a)$, where "a" represents a smoothing factor. For example, "a" can be selected to be any value greater than or equal to zero and less than or equal to one.

When the query result acquiring service becomes stable (e.g., more queries are submitted by users), the correction factor will eventually converge to a value. Thus, generally, a relatively small smoothing factor may be selected. In some embodiments, a value greater than or equal to 0 and smaller than or equal to 0.4 is selected for the smoothing factor "a." For example, a smoothing factor of a=0.2 may be selected.

However, in some situations, if the query result acquiring service is less stable (e.g., few queries are submitted by users and/or queries are infrequently submitted by users), the correction factor will fluctuate more. Depending on the situation, the smoothing factor "a" may be increased, which will attribute greater influence of the impact of recent data on forecast results.

In actual implementation, the smoothing factor "a" may be properly selected in light of the characteristics of the current service (e.g., how stable the results acquiring service is).

In the special case in which the current query is the first query (e.g., because the historical data corresponding to any previous queries were deleted), then the defect ratio $R_w$ is set to a default of zero for the most recent page query and the correction factor r' is also set to a default of zero for the most recent page query. As such, the correction factor r corresponding to the current query is zero. Therefore, in the special case in which the current query is the first query, no corrections are made to the default query results request quantity and so the corrected query results request quantity equals the default query results request quantity.

By repeating process 300 for subsequent queries, the proportion of query results retrieved for previous queries can be used to help forecast a corrected default quantity of query results to request for a current query. The predicted value of the correction factor r for each current query will become increasingly more precise over time. Over time, the correction factor r for each current query will approach the value of the correction factor r that would have been predetermined based on historical data of all past query results and their probability of compliance with the display conditions.

FIG. 4 is a flow diagram showing an embodiment of a process of performing a supplemental search for a current query. In some embodiments, process 400 is implemented at system 100 of FIG. 1. In some embodiments, step 212 of process 200 of FIG. 2 is implemented using the process of FIG. 4.

Process 400 describes a process in which one or more supplemental searches are performed after an initial search for a current query until the total of the numbers of compliant query results from the initial search and one or more supplemental searches equals to the N desired quantity of query results to display per page.

As described at step 212 of FIG. 2, when the $N_{1correct}$ number of compliant query results within the $N_1$ page query results retrieved in the initial search for a current query is less than the N desired quantity of query results to display per page, at least one supplemental search is to be performed to obtain the remaining query results needed to complete the desired quantity of query results to display per page.

At 402, a current page gap quantity is determined based at least in part on a total quantity of compliant query results associated with one or more previous searches and a desired quantity of query results to display per page. In some embodiments, the current page gap quantity is the difference between the current total (e.g., sum of the quantities) of the $N_{1correct}$ compliant query results from the initial search and one or more previous supplemental searches, if any, and the N desired quantity of query results to display per page. For example, the current page gap quantity is represented as $N_k$.

For example, if only the initial search and no previous supplemental searches have been performed, then the page gap quantity is the difference between the $N_{1correct}$ quantity of compliant query results associated with the initial search and the N desired quantity of query results to display per page and $N_k$ can be determined using the following formula:

$$N_k = N - N_{1correct} \quad (3)$$

At 404, a current supplemental query results request quantity is determined based at least in part on the current page gap quantity and a correction factor corresponding to a current query. The number of query results that are required to supplement the number of compliant query results retrieved in the initial search and the number of compliant query results retrieved in one or more previous supplemental searches, if any, is referred to as a "current supplement query results request quantity" and can be represented by $N_2$. In some embodiments, the supplemental query results request quantity is determined using the following formula: $N_2 = N_k * (1+r)$, where "r" represents the correction factor determined for the current query.

At 406, a current supplemental search is performed for a plurality of query results corresponding to the current supplemental query results request quantity. A current supplemental search for a number of query results responsive to the current query that is equal to the current supplemental query results quantity of query results is performed. For example, the server can acquire $N_2$ query results through a page query request including by submitting the current query to a search engine to acquire at least $N_2$ query results. For example, the $N_2$ query results include the query results from a data source starting from the first position (e.g., in a ranking) after the position (e.g., in the ranking) of the last query result acquired by the most recent search for query results to display at the current query results page.

For example, if the initial search had acquired the query result from the first (e.g., ranking) position up to the $N_1$th position, then in the first supplemental search, the server can acquire the query results at the $(N_1+1)$th position through the query results at $(N_1+N_2)$th position responsive to the current query including by submitting another page query request to a search engine or a database server to acquire the $N_2$ query results.

At 408, a quantity of compliant query results of the plurality of query results is determined by comparing at least some of the plurality of query results to one or more display conditions. Each query result of the $N_2$ query results that were retrieved by the current supplemental search is compared to the display conditions to determine whether it meets/is compliant with the display conditions. Each query result that meets the one or more display conditions is included in the quantity of compliant query results. Those query results of the $N_2$ query results retrieved by the current supplemental search that meet the display conditions are determined. For example, the number of query results of the $N_2$ query results that were retrieved that meet the display conditions is represented as $N_{2correct}$.

In some embodiments, in the process of comparing each query result of the $N_2$ query results that were retrieved by the supplemental search, the query results that did meet the display conditions are retained and to be displayed and the query results that did not meet the display conditions are eliminated from being displayed.

At 410, it is determined whether a subsequent supplemental search is needed based at least in part on the quantity of compliant query results. Whether a subsequent supplemental search is needed is determined based at least in part on comparing the number of compliant query results, $N_{2correct}$, to the current page gap quantity page, $N_k$.

In the event that the number of compliant query results from the current supplemental search, $N_{2correct}$, is equal to the current page gap quantity, $N_k$ (that is, $N_{2correct}=N_k$), then a subsequent supplemental search is not needed. In the event that the subsequent supplemental search is not needed, control is transferred to 412. At 412, the compliant query results retrieved by the current supplemental search are caused to be displayed together with compliant query results retrieved by the one or more previous searches. If at least one previous supplement search has been implemented, then the $N_{2correct}$ compliant query results from the current supplemental search are displayed together with the $N_{1correct}$ compliant query results from the initial search and the compliant query results from the one or more previous supplemental searches. For example, a page of query results including the $N_{2correct}$ compliant query results and the $N_{1correct}$ compliant query results are sent to a client device to be displayed at the client device.

For example, if only the initial search and no previous supplemental searches have been performed, the $N_{2correct}$ query results obtained in the current supplemental search are displayed at the query results page together with the $N_{1correct}$ compliant query results obtained in the initial search. That is, the total of the $N_{1correct}$ compliant query results and the $N_{2correct}$ compliant query results add up to the N desired quantity of query results to display per page ($N_{1correct}$+$N_{2correct}$=N).

In the event that there still are retrieved query results remaining after $N_{2correct}$=$N_k$ compliant query results are found, then the remaining query results of the retrieved set that have yet to be compared to the display conditions are discarded (e.g., not considered for being displayed at the page). In some embodiments, the retrieved query results that have yet to be compared to the display results are discarded and are to be re-acquired in the next search. For example, if in comparing the ($N_1$+n')th query results (n'<$N_2$) in the comparison of each of the $N_2$ query results retrieved by the current supplemental search to the display conditions, the condition $N_{2correct}$=$N_k$ is satisfied, then the page query for the next search begins extracting from the ($N_1$+n'+1)th query result from the data source.

However, in the event that all of the $N_2$ retrieved query results retrieved by the current supplemental search have been compared with the display conditions and the number of compliant query results, $N_{2correct}$, is less than the current page gap quantity, $N_k$, ($N_{2correct}$<$N_k$), then a subsequent supplemental search is needed. In the event that the subsequent supplemental search is needed, control is returned to 402 and the subsequent supplemental search is referred to as the current supplemental search in the next iteration of process 400. If the total number of compliant query results retrieved from one or more previous searches is fewer than the desired quantity of query results to display per page, then additional query results to display at the query results page need to be obtained by a subsequent supplemental search. Put another way, in the event that $N_{2correct}$<$N_k$, another supplemental search for query results responsive to the current query is to be performed. Process 400 is repeated to perform a subsequent supplemental search for query results to obtain at least the difference in query results between the $N_{2correct}$ number of compliant query results determined from the previous supplemental search and the $N_k$ previous page gap quantity, ($N_k$−$N_{2correct}$).

Process 400 describes one example in which a supplemental search can be performed. In actual implementation, a supplemental search can be performed using any appropriate technique.

FIGS. 2 through 4 describe retrieving query results to display at one query results page. To determine the query results to display at the next query results page (e.g., in response to a user selection to view the next page), one or more of FIGS. 2 through 4 may be performed again.

Although, in some embodiments, the number of query results that is acquired for each request is increased beyond the desired quantity of query results to display per page, the probability that a second (e.g., a supplemental) search query will be needed is greatly reduced from conventional systems. The following is an example proof of this improvement:

Assume that the N desired quantity of query results to display per page is 50 and that the correction factor r is 10%. Since a binomial distribution applies here, i.e., each query result has only two possible results (e.g., display conditions met or not met) and they are mutually exclusive and independent, and are unrelated to other query results, the probability that a query result event will occur remains unchanged within the entire series of testing. Therefore, a binomial distribution, as shown below as formula (4), is used for testing here.

$$P_n(k) = C_n^k p^k (1-p)^{n-k} \quad (4)$$

In formula (4), n represents the number of experiments (e.g., the number of query results to acquire from a data source), p represents the probability of success of an experiment (e.g., the probability that an acquired query result meets the display conditions), and k represents the number of successful experiments (e.g., the number of acquired query results that meet the display conditions). According to conventional systems, the number of query results needed to be acquired by one search is only 50. The probability that all 50 acquired query results will comply with the current display requirement is as follows in formula (5) in which p is (1−r)=0.9:

$$P_{50}(50) = C_{50}^{50} p^{50} (1-0.9)^{50-50} = 0.5\% \quad (5)$$

That is, the probability that all 50 acquired query results will comply with the current display requirements is 0.5%. In other words, 99.5% of the time, one or more supplemental searches will be needed.

In contrast, with the embodiments described herein, there will be N*(1+r), or 55, query results acquired for each search. In order for a second (e.g., supplemental) query to not be needed, then there will be at least 50 query results among the 55 retrieved results that can comply with current display requirements. The corresponding probability is:

The probability that all 55 results will comply with current display requirements=The probability that 0 of the results will not comply with current display requirements The probability that 1 of the results will not comply with current display requirements+The probability that 2 of the results will not comply with current display requirements+ The probability that 3 of the results will not comply with current display requirements+The probability that 4 of the results will not comply with current display requirements+ The probability that 5 of the results will not comply with current display requirements.

The above probability is put in mathematical terms in formula (6) below where p is r=0.1:

$$P_{55}(0) + P_{55}(1) + P_{55}(2) + P_{55}(3) + P_{55}(4) + P_{55}(5) = 52.4\% \quad (6)$$

That is, the probability that at least 50 of 55 acquired query results will comply with the current display requirements is 52.4%. In other words, 47.6% of the time, one or more supplemental searches will be needed.

In this example using the embodiments described herein, even though the number of query results requested each time increased by 10%, the probability that a second (e.g., supplemental) query will be needed drops from 99.5% to 47.6%.

Given the characteristics of Internet applications, a small increase in the number of query results to obtain for each request comes at a very small increase in resource expenditure. However, establishing and maintaining a connection with a search engine or a database (e.g., or any other data source on which a search is performed) requires a relatively large amount of time and resources. Therefore, the embodiments described herein of displaying a page of query results can greatly improve query efficiency and performance, reduce the number of requests to search engines or databases, and save on search engine resources, and network bandwidth resources, for example.

Figure 5:
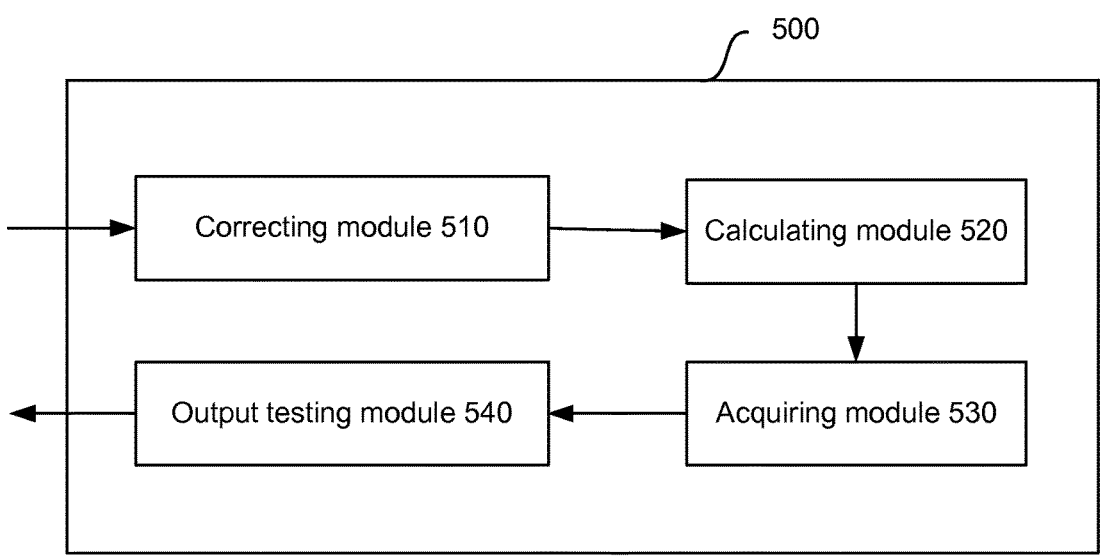
FIG. 5 is a diagram showing an embodiment of a system for providing a page of query results.

FIG. 5 is a diagram showing an embodiment of a system for providing a page of query results. In the example, system 500 includes correcting module 510, calculating module 520, acquiring module 530, and output testing module 540. The modules can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

Correcting module 510 is configured to determine a correction factor for adjusting a page query results quantity. Calculating module 520 is configured to determine a corrected page query results quantity based at least in part on a correction factor. Acquiring module 530 is configured to acquire a number of query results corresponding to the corrected page query results quantity. Output testing module 540 is configured to compare each retrieved query result to the one or more display conditions to determine whether the query results comply with the display conditions. In the event that the quantity of query results that comply with the display conditions equals the desired quantity of query results to display per page, then those compliant query results are included in a query results page to be displayed.

In some embodiments, device 500 may further include a supplementary search module (not shown). In the event that the quantity of query results that comply with the display conditions is less than the desired quantity of query results to display per page, the supplementary search module is configured to determine the page gap quantity as the difference between the desired quantity of query results to display per page and the quantity of query results that comply with the display conditions. Furthermore, the supplementary search module is configured to determine a supplementary query results quantity based at least in part on the correction factor, perform a current supplemental search for a plurality of query results corresponding to the current supplemental query results request quantity, and determine which for the acquired query results complies with the display conditions. In the event that the supplementary search module determines that the quantity of query results that comply with the display conditions equals the page gap quantity, the supplementary search module is configured to display the compliant query results retrieved by the supplemental search together with compliant query results determined from one or more previous searches.

In some embodiments, correcting module 510 is configured to determine a correction factor based at least in part by statistically calculating the probability of historical query results that fail to comply with the display conditions. For example, the correction factor can be updated based on the latest historical query results data every preset interval of time.

In some embodiments, correcting module 510 is configured to dynamically determine a correction factor based at least in part on the proportion of query results obtained for the most recent query to fail to comply with the display conditions and the correction factor used in the most recent page query.

Figure 6:
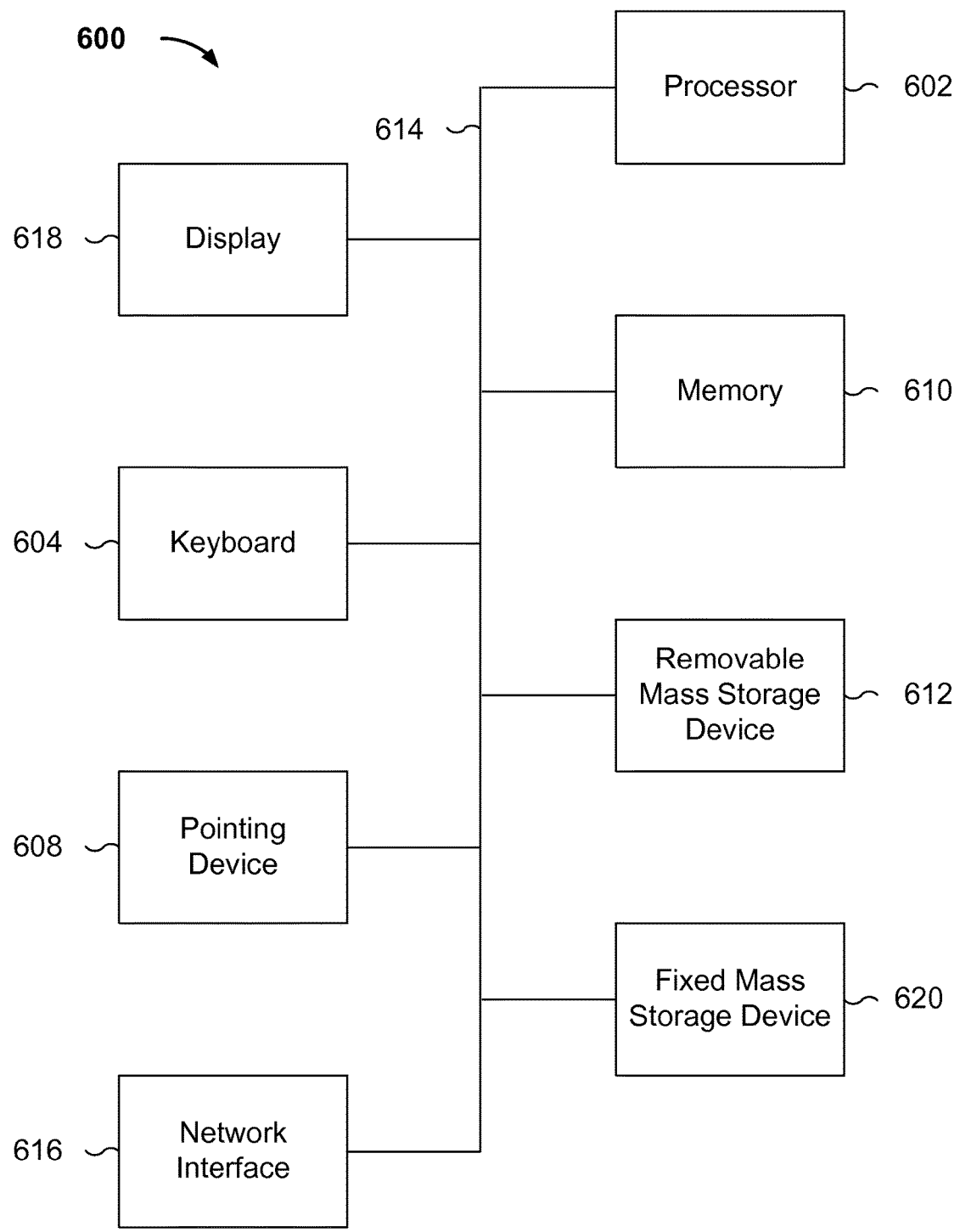
FIG. 6 is a functional diagram illustrating an embodiment of a programmed computer system for implementing a service for providing a page of query results.

FIG. 6 is a functional diagram illustrating an embodiment of a programmed computer system for implementing a service for providing a page of query results. As will be apparent, other computer system architectures and configurations can be used to determine message data to present based on a message. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618). In some embodiments, processor 602 includes and/or is used to provide a page of query results.

Processor 602 is coupled bi-directionally with memory 610, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600 and is coupled either bi-directionally (read/write) or uni-directionally (read only) to processor 602. For example, storage 612 can also include computer readable media such as magnetic tape, flash memory, PC-CARDS, portable mass storage devices, holographic storage devices, and other storage devices. A fixed mass storage 620 can also, for example, provide additional data storage capacity. The most common example of fixed mass storage 620 is a hard disk drive. Mass storage 612, 620 generally store additional programming instructions, data, and the like that typically are not in active use by the processor 602. It will be appreciated that the information retained within mass storage 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display 618, a network interface 616, a keyboard 604, and a pointing device 608, as well as an auxiliary input/output device interface, a sound card, speakers, and other subsystems as needed. For example, the pointing device 608 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

A person skilled in the art should understand that embodiments of the present application can be provided as methods, systems or computer program products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

In one typical configuration, the computer equipment comprises one or more processors (CPUs), input/output interfaces, network interfaces, and memory.

Memory may include such forms as volatile storage devices in computer-readable media, random access memory (RAM) and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information may be computer-readable commands, data structures, program modules, or other data. Examples of computer storage media include but are not limited to phase-change memory (PRAM), static random access memory (SRAM), dynamic random access memory (DRAM), other types of random access memory, read-only memory (ROM), electrically erasable programmable read-only memory (EEPROM), flash memory, or other memory technology, CD-ROM, digital multifunction disc (DVD) or other optical storage, magnetic cassettes, magnetic tape or magnetic disc memory, or other magnetic storage equipment or any other non-transmission media that can be used to store information that is accessible to computers. As defined in this document, computer-readable media does not include transitory computer-readable media, such as modulated data signals and carrier waves.

For persons skilled in the art, the present application may have various modifications and variations. Any modification, equivalent substitution, or improvement made within the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive a current query;
determine a correction factor corresponding to the current query, wherein the correction factor is configured to adjust a page query results quantity, including to:
determine a plurality of historical query results that is retrieved over a preset interval of time;
determine a portion of the plurality of historical query results that do not meet at least one display condition; and
determine the correction factor corresponding to the current query based at least in part on a number of historical query results included in the portion of the plurality of historical query results that do not meet at least one display condition and a total number of historical query results included in the plurality of historical query results;
determine a corrected current query results request quantity based at least in part on the correction factor and a desired quantity of query results to display per page, wherein the corrected current query results request quantity is greater than the desired quantity of query results to display per page;
perform an initial search for a plurality of current query results responsive to the current query, wherein a quantity of current query results included in the plurality of current query results corresponds to the corrected current query results request quantity;
determine a quantity of compliant current query results of the plurality of current query results by comparing at least some of the plurality of current query results to one or more display conditions and identifying compliant current query results that meet the one or more display conditions; and
cause a page of current query results to be presented based at least in part on the quantity of compliant current query results; and
one or more memories coupled to the one or more processors and configured to provide the one or more processors with instructions.

2. The system of claim 1, wherein to determine the corrected current query results request quantity based at least in part on the correction factor includes to adjust the desired quantity of query results to display per page by the correction factor.

3. The system of claim 1, wherein to cause the page of current query results to be presented based at least in part on the quantity of compliant current query results includes comparing the quantity of compliant current query results to the desired quantity of query results to display per page.

4. The system of claim 3, wherein in the event that the quantity of compliant current query results is equal to the desired quantity of query results to display per page, wherein to cause the page of current query results to be presented includes to send data associated with the page of current query results including compliant current query results associated with the quantity of compliant current query results to a client device.

5. The system of claim 3, wherein in the event that the quantity of compliant current query results is less than the desired quantity of query results to display per page, the plurality of current query results comprises a first plurality of current query results, the quantity of compliant current query results comprises a first quantity of compliant current query results, wherein to cause the page of current query results to be presented includes to:
- determine a page gap quantity based at least in part on the first quantity of compliant current query results and the desired quantity of query results to display per page;
- determine a supplemental current query results request quantity based at least in part on the page gap quantity and the correction factor corresponding to the current query;
- perform a supplemental search for a second plurality of current query results responsive to the current query, wherein the second plurality of current query results corresponds to the supplemental current query results request quantity;
- determine a second quantity of compliant current query results from the second plurality of current query results by comparing at least some of the second plurality of current query results to the one or more display conditions; and
- compare the second quantity of compliant current query results to the page gap quantity.

6. The system of claim 5, wherein in the event that the second quantity of compliant current query results is equal to the page gap quantity, wherein to cause the page of current query results to be presented further includes to send data associated with the page of current query results including compliant current query results associated with the first quantity of compliant current query results and compliant current query results associated with the second quantity of compliant current query results.

7. The system of claim 5, wherein in the event that the second quantity of compliant current query results is less than the page gap quantity, wherein to cause the page of current query results to be presented further includes performing a subsequent supplemental search.

8. A method, comprising:
- receiving a current query;
- determining a correction factor corresponding to the current query, wherein the correction factor is configured to adjust a page query results quantity, including:
  - determining a plurality of historical query results that is retrieved over a preset interval of time;
  - determining a portion of the plurality of historical query results that do not meet at least one display condition; and
  - determining the correction factor corresponding to the current query based at least in part on a number of historical query results included in the portion of the plurality of historical query results that do not meet at least one display condition and a total number of historical query results included in the plurality of historical query results;
- determining a corrected current query results request quantity based at least in part on the correction factor and a desired quantity of query results to display per page, wherein the corrected current query results request quantity is greater than the desired quantity of query results to display per page;
- performing an initial search for a plurality of current query results responsive to the current query, wherein a quantity of current query results included in the plurality of current query results corresponds to the corrected current query results request quantity;
- determining a quantity of compliant current query results of the plurality of current query results by comparing at least some of the plurality of current query results to one or more display conditions and identifying compliant current query results that meet the one or more display condition; and
- causing a page of current query results to be presented based at least in part on the quantity of compliant current query results.

9. The method of claim 8, wherein determining the corrected current query results request quantity based at least in part on the correction factor includes adjusting the desired quantity of query results to display per page by the correction factor.

10. The method of claim 8, wherein causing the page of current query results to be presented based at least in part on the quantity of compliant current query results includes comparing the quantity of compliant current query results to the desired quantity of query results to display per page.

11. The method of claim 10, wherein in the event that the quantity of compliant current query results is equal to the desired quantity of query results to display per page, wherein causing the page of current query results to be presented includes sending data associated with the page of current query results including compliant current query results associated with the quantity of compliant current query results to a client device.

12. The method of claim 10, wherein in the event that the quantity of compliant current query results is less than the desired quantity of query results to display per page, the plurality of current query results comprises a first plurality of current query results, the quantity of compliant current query results comprises a first quantity of compliant current query results, wherein causing the page of current query results to be presented includes:
- determining a page gap quantity based at least in part on the first quantity of compliant current query results and the desired quantity of query results to display per page;
- determining a supplemental current query results request quantity based at least in part on the page gap quantity and the correction factor corresponding to the current query;
- performing a supplemental search for a second plurality of current query results responsive to the current query, wherein the second plurality of current query results corresponds to the supplemental current query results request quantity;
- determining a second quantity of compliant current query results from the second plurality of current query results by comparing at least some of the second plurality of current query results to the one or more display conditions; and
- comparing the second quantity of compliant current query results to the page gap quantity.

13. The method of claim 12, wherein in the event that the second quantity of compliant current query results is equal to the page gap quantity, wherein causing the page of current query results to be presented further includes sending data associated with the page of current query results including compliant current query results associated with the first quantity of compliant current query results and compliant current query results associated with the second quantity of compliant current query results.

14. The method of claim 12, wherein in the event that the second quantity of compliant current query results is less than the page gap quantity, wherein causing the page of current query results to be presented further includes performing a subsequent supplemental search.

15. A computer program product, the computer program product being embodied in a non-transitory computer readable storage medium and comprising computer instructions for:
  receiving a current query;
  determining a correction factor corresponding to the current query, wherein the correction factor is configured to adjust a page query results quantity, including:
    determining a plurality of historical query results that is retrieved over a preset interval of time;
    determining a portion of the plurality of historical query results that do not meet at least one display condition; and
    determining the correction factor corresponding to the current query based at least in part on a number of historical query results included in the portion of the plurality of historical query results that do not meet at least one display condition and a total number of historical query results included in the plurality of historical query results;
  determining a corrected current query results request quantity based at least in part on the correction factor and a desired quantity of query results to display per page, wherein the corrected current query results request quantity is greater than the desired quantity of query results to display per page;
  performing an initial search for a plurality of current query results responsive to the current query, wherein a quantity of current query results included in the plurality of current query results corresponds to the corrected current query results request quantity;
  determining a quantity of compliant current query results of the plurality of current query results by comparing at least some of the plurality of current query results to one or more display conditions and identifying compliant current query results that meet the one or more display conditions; and
  causing a page of current query results to be presented based at least in part on the quantity of compliant current query results.

16. The computer program product of claim 15, wherein causing the page of current query results to be presented based at least in part on the quantity of compliant current query results includes comparing the quantity of compliant current query results to the desired quantity of query results to display per page.

17. The computer program product of claim 16, wherein in the event that the quantity of compliant current query results is equal to the desired quantity of query results to display per page, wherein causing the page of current query results to be presented includes sending data associated with the page of current query results including compliant current query results associated with the quantity of compliant current query results to a client device.

18. The computer program product of claim 16, wherein in the event that the quantity of compliant current query results is less than the desired quantity of query results to display per page, the plurality of current query results comprises a first plurality of current query results, the quantity of compliant current query results comprises a first quantity of compliant current query results, wherein causing the page of current query results to be presented includes:
  determining a page gap quantity based at least in part on the first quantity of compliant current query results and the desired quantity of query results to display per page;
  determining a supplemental current query results request quantity based at least in part on the page gap quantity and the correction factor corresponding to the current query;
  performing a supplemental search for a second plurality of current query results responsive to the current query, wherein the second plurality of current query results corresponds to the supplemental current query results request quantity;
  determining a second quantity of compliant current query results from the second plurality of current query results by comparing at least some of the second plurality of current query results to the one or more display conditions; and
  comparing the second quantity of compliant current query results to the page gap quantity.

19. The computer program product of claim 18, wherein in the event that the second quantity of compliant current query results is equal to the page gap quantity, wherein causing the page of current query results to be presented further includes sending data associated with the page of current query results including compliant current query results associated with the first quantity of compliant current query results and compliant current query results associated with the second quantity of compliant current query results.

20. The computer program product of claim 18, wherein in the event that the second quantity of compliant current query results is less than the page gap quantity, wherein causing the page of current query results to be presented further includes performing a subsequent supplemental search.

* * * * *